(12) United States Patent
Buss (10) Patent No.: US 8,707,400 B2
(45) Date of Patent: Apr. 22, 2014

(54) SYSTEM AND METHOD FOR IMPLEMENTING AN EXTENDED AUTHENTICATION AND AUTHORIZATION CREDENTIAL STORE

(75) Inventor: Duane Buss, West Mountain, UT (US)

(73) Assignee: Apple Inc., Cupertino, CA (US)

( * ) Notice: Subject to any disclaimer, the term of this patent is extended or adjusted under 35 U.S.C. 154(b) by 1451 days.

(21) Appl. No.: 11/625,663

(22) Filed: Jan. 22, 2007

(65) Prior Publication Data

US 2008/0178270 A1 Jul. 24, 2008

(51) Int. Cl.
*H04L 29/06* (2006.01)

(52) U.S. Cl.
CPC .................................. *H04L 63/083* (2013.01)
USPC ...................................... 726/5; 726/6; 726/7

(58) Field of Classification Search
CPC .................................................... H04L 63/083
USPC .......................................... 726/5, 6, 7, 18, 19
See application file for complete search history.

(56) References Cited

U.S. PATENT DOCUMENTS

| | | | |
|---|---|---|---|
| 5,875,296 A | 2/1999 | Shi et al. | |
| 6,484,263 B1 | 11/2002 | Liu | |
| 7,441,263 B1* | 10/2008 | Bakshi et al. | 726/2 |
| 7,552,467 B2* | 6/2009 | Lindsay | 726/5 |
| 2002/0062342 A1 | 5/2002 | Sidles | |
| 2002/0116646 A1* | 8/2002 | Mont et al. | 713/201 |
| 2002/0116647 A1* | 8/2002 | Mont et al. | 713/201 |
| 2003/0236975 A1* | 12/2003 | Birk et al. | 713/156 |
| 2004/0117617 A1* | 6/2004 | Geller et al. | 713/156 |
| 2004/0158746 A1 | 8/2004 | Hu et al. | |
| 2005/0289644 A1* | 12/2005 | Wray | 726/5 |
| 2006/0129817 A1* | 6/2006 | Borneman et al. | 713/170 |
| 2006/0206418 A1* | 9/2006 | Byrne et al. | 705/39 |
| 2007/0179794 A1* | 8/2007 | Fisher et al. | 705/1 |
| 2007/0208602 A1* | 9/2007 | Nocera et al. | 705/8 |
| 2008/0148368 A1* | 6/2008 | Zurko et al. | 726/5 |

OTHER PUBLICATIONS

European Search Report, European Patent Application No. 08100442.6 dated Apr. 23, 2008, 5 pages.
"Writing a Better Resume—A Better Resume for the Job Candidate", Resumefit, www.resumefit.com/resumecandidateresumefit.html, pp. 1-2.
"Resume Writing & Resume Sourcing Solution—Science and Technology", Resumefit, www.resumefit.com/resumescience.html, pp. 1-2.

(Continued)

*Primary Examiner* — Bradley Holder
(74) *Attorney, Agent, or Firm* — Womble Carlyle Sandridge & Rice LLP (57) ABSTRACT

A system and method for consumer-side authorization and authentication is disclosed. In one embodiment, the method comprises receiving a request for a credential from a business-side party, matching the credential request to a set of available credentials, the available credentials comprising consumer-side information. The credential is retrieved from a credential store, and the authorization of the business-side party to receive the credential is evaluated before returning a response. In another embodiment, the system comprises a receiver module adapted to receive credential requests from business-side parties. The credential request is passed to a selection and matching module for matching against consumer-side credentials. The credential is retrieved from a storage and retrieval module, but is not passed until an authorization module allows a sender module to return a credential response to the business-side party.

16 Claims, 2 Drawing Sheets (56) References Cited

OTHER PUBLICATIONS

"Resume Writing & Resume Sourcing Solution—Digital Signature Technology", Resumefit, www.resumefit.com/resumedigital.html, pp. 1-2.
Schmidt, T., "The Problem of Identifying Candidate Quality", Resumefit, www.resumefit.com/resumebigfive.html, pp. 1-4.
"The Resumefit Resume—Frequently Asked Questions", Resumefit, www.resumefit.com/resumecandidatefaq.html, pp. 1-2.
"Resumefit LLC/Right Fit. Right Hire.", Resumefit LLC, www.resumefit.typepad.com, pp. 1-4.
"Yahoo! Anti-Spam Resource Center—Domain Keys", Yahoo! Mail, http://antispam.yahoo.com/domainkeys, pp. 1-8.
"Random Reputation Ramblings", Phil Windley's Technometria—Random Reputation Ramblings, http://www.windley.com/archives/2007/03/random_reputation_ramblings_shtml, pp. 1-5.
"Internet Identity—Reputation Networks and more", http://blog.joeandrieu.com/2006/12/03/internet-identity-reputation-networks-and-more/, pp. 1-4.
"Privacy Issues—From Project VRM", http://cyberlaw.harvard.edu/projectvrm/Privacy_issues, pp. 1-2.
"Harness the power of Reputation", iKarma, Inc., iKarma.com.
"The Alpha Gorb", The GORB, thegorb.com, pp. 1-7.
"What is RapLeaf?", RapLeaf, rapleaf.com.
"Microsoft's Vision for an Identity Metasystem", Microsoft Corporation, May 2005, http://www.identityblog.com/stories/2005/07/05/IdentityMetasystem.htm, pp. 1-10.
Windows CardSpace (formerly "InfoCard"), Microsoft Corporation 2007, http://msdn2.microsoft.com/en-us/netframework/aa663320.aspx, pp. 1-2.
"Gnome Keyring", Wikipedia, the free encyclopedia, http://en.wikipedia.org/wiki/GNOME_Keyring, pp. 1-2.
Staikos, et al., "The KWallet Handbook" The KWallet Handbook, http://docs.kde.org/stable/en/kdeutils/kwallet/index.html, pp. 1-12.
"RoboForm—remembers passwords so you don't have to", RoboForm, http://www.roboform.com/.
"Sxipper- Beta", Sxip Identity Corporation, http://www.sxipper.com/.
"Google Toolbar for Firefox", Google 2007, http://www.google.com/tools/firefox/toolbar/FT3/intl/en/index.html?utm_campaign=en&utm_source=en-ha-na-us-google&utm_medium=ha&utm_term=toolbar%20google&tbbrand=GFRG.
"Norton Confidential Bata—Frequently Asked Questions", Symantec Corp., http://www.symantec.com/home_homeoffice/transactsafely/ncobetafaq.jsp, pp. 1-3.
Edelman, B. et al., "Adverse Selection in Online 'Trust' Certifications", Sep. 6, 2006 Draft, pp. 1-35.
"SAML", Wikipedia, the free encyclopedia, http://en.wikipedia.org/wiki/SAML, pp. 1-11.
"Differences Between Oasis Security Assertion Markup Language (SAML) V1.1 and V1.0", Oasis Open, Prateek Mishra Editor, May 21, 2003, http://www.oasis-open.org/committees/download.php/3412/sstc-saml-diff-1.1-draft-01.pdf, pp. 1-6.
"Welcome to the Better Business Bureau", Better Business Bureau (BBB), http://www.thelocalbbb.org/members/programs.html, pp. 1-2.
"How Do You Make Sense of Web-Based Seals?", TRUSTe—Make Privacy Your Choice, http://www.truste.org/articles/seals_comparison.php, pp. 1-3.
"Privacy-Enhancing Cryptography", IBM Zurich Research Laboratory, http://www.zurich.ibm.com/security/privacy/, pp. 1-3.
"Why Choose Cybertrust", Cybertrust 2007, www.cybertrust.com, pp. 1-2.

* cited by examiner

SYSTEM AND METHOD FOR IMPLEMENTING AN EXTENDED AUTHENTICATION AND AUTHORIZATION CREDENTIAL STORE

BACKGROUND

A password manager is a software product that helps a user securely store and access user names, passwords, and PIN codes. As typically implemented, a password manager uses a local encrypted database to hold username/password pairs as well as the URLs and applications to which the username/password pairs pertain. Some password managers also work as "form fillers," automatically populating fields in authorization forms; other password managers contain password generation facilities.

Various password managers are available in the market. At least one such password manager was originally developed as part of a larger massaging software application, which used the password manager to manage all of the user's login credentials. Other password managers are integrated with specific applications, such as browsers, or provide system-wide password management services.

Some online services are also comparable. For example, at least one online service was originally designed as a single sign-on (SSO) service providing authentication to a variety of online sites. These services generally focus on providing a single credential that provides authentication for many sites, rather than managing multiple credentials and associating each credential with one or more sites. Some of the currently available services were also originally designed to provide member sites with other information (such as a person's name) and provide a single central payment processing platform; however, such efforts were cancelled due to data security and privacy concerns.

SUMMARY

A system and method for consumer-side authorization and authentication is disclosed. In one embodiment, the method comprises receiving a request for a credential from a business-side party, matching the credential request to a set of available credentials, the available credentials comprising consumer-side information. The credential is retrieved from a credential store, and the authorization of the business-side party to receive the credential is evaluated before returning a response.

In another embodiment, the system comprises a receiver module adapted to receive credential requests from business-side parties. The credential request is passed to a selection and matching module for matching against consumer-side credentials. The credential is retrieved from a storage and retrieval module, but is not passed, until an authorization module allows a sender module to return a credential response to the business-side party.

DETAILED DESCRIPTION

One embodiment includes an extended credential store system and associated method. To better illustrate the advantages and features of various embodiments, a particular description of several embodiments will be provided with reference to the attached drawings. These drawings, and other embodiments described herein, only illustrate selected aspects of the embodiments and do not limit the scope thereof. Further, despite reference to specific features illustrated in the example embodiments, it will nevertheless be understood that these features are not essential to all embodiments and no limitation of the scope thereof is thereby intended. Possible alterations, modifications, and applications of the principles described herein, such as would occur to one skilled in the art, have been omitted for clarity and brevity; nevertheless, it is understood that such alterations, modifications, and applications are contemplated. Furthermore, some items are shown in a simplified form, and inherently include components that are well known in the art. Further still, some items are illustrated as being in direct connection for the sake of simplicity. Despite the apparent direct connection, it is understood that such illustration does not preclude the existence of intermediate components not otherwise illustrated. Finally, the discussion of the detailed drawings includes mention of particular steps that are taken in sequence. Nevertheless, other sequences are possible and contemplated; for example, a multi-step authentication request/response and authorization request/response can be consolidated in light of some embodiments discussed herein. Other steps have been separated out simply for clarity of exposition and not because of technical need, and no limitation of the scope is thereby intended. Further, the examples herein will be discussed relative to a computer application; however, other embodiments, such as smart cards, are contemplated.

Figure 1:
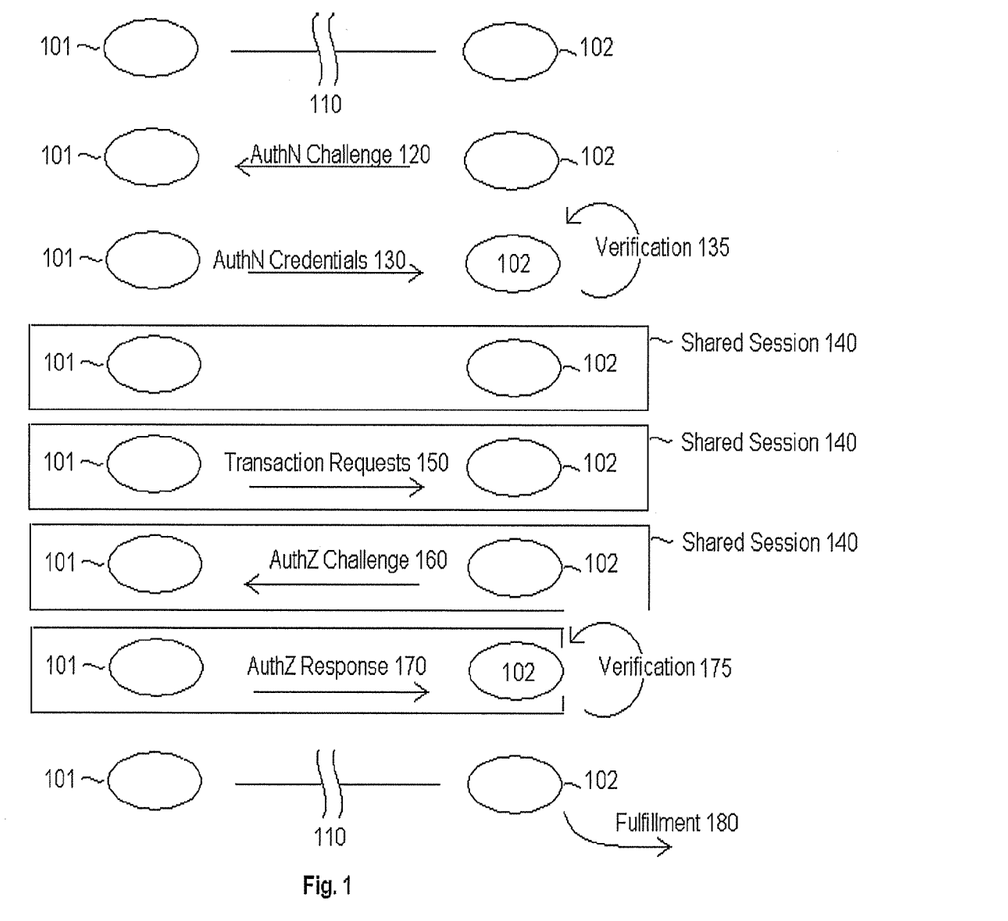
FIG. 1 is a flowchart showing the movement of credential information in a transaction in accordance with one embodiment.

Most online transactions can be modeled as a multi-step process between two parties, as illustrated by the flowchart in FIG. 1. FIG. 1 illustrates a situation in which two parties 101 and 102 want to engage in a transaction with one another. In the illustrated example, it will be assumed that the transaction is a purchase from an online store over HTTP and that the party 101 is the buyer and the party 102 is the seller. However, other embodiments using alternative means are contemplated. In a typical situation, the two parties 101, 102, start out effectively anonymous to each other, as represented by a break between them at 110. In some embodiments, there is less than total anonymity. For example, cookies or other persistence devices may serve to reestablish a prior authentication relationship. Nevertheless, re-authentication is necessary to proceed with the transaction; therefore, they are effectively anonymous to each other.

To proceed with the transaction, the parties must exchange both authentication credentials and authorization credentials. In the current context, authentication refers to the process of verifying a digital identity through the use of one or more tokens. In one embodiment, this is done by associating an identity specifier such as a username, URL, or email address with a proof token such as a password. In another embodiment, this is done by cryptographically signing something using the private part of a public/private key pair. In a third embodiment, the authentication does not establish identity at all, but only a narrow right or status in the context of the transaction. The authenticated party may be a person using a computer, a computer itself or a computer program.

By way of contrast, authorization focuses on the ability of an actor associated with a particular identity to take some action. In the context of the current embodiment, the request for payment details such as a credit card number is implicitly a request for authorization to engage in some action. In some transactions, this authorization step is made explicit through the use of a confirmation page. In other transactions, substantial parts of the model are implicit. Those skilled in the art will note that there are mutual authorization checks—the buyer authorizes the seller to make a particular charge, and the seller checks to see if the buyer is authorized to authorize a charge. However, only authentication and authorization of the buyer is typically automated. Browsers and password manager programs may partially automate responses to authentication challenges, but buyer-side processes for the authentication and authorization of the seller are ad-hoc.

Continuing with FIG. 1, a typical transaction therefore goes through a seller authentication phase, a buyer authentication phase, a seller authorization phase, and a buyer authorization phase. The seller authentication phase typically is implicit—the buyer goes to www.company.com and assumes that the correct company is associated with that domain. In the buyer authentication phase, the seller 102 presents the buyer with an authentication challenge 120. The challenge 120 may take the form of a login box or an, HTTP 401 Unauthorized response, or additional specific request. In return, the buyer 101 presents authentication credentials 130, such as usernames, passwords, and PINs, to the seller 102. The seller 102 verifies the authentication credentials 130, as represented by the arrow 135, and establishes a shared session 140.

Once the shared session 140 is established, the parties 101 and 102 proceed with the seller authorization phase. The buyer 101 presents or confirms a transaction request 150 to the seller 102. The seller 102 responds with an authorization request 160, such as a request for credit card information. The buyer 101 authorizes the seller to take action by returning an authorization response 170, such as a credit card number and expiration date. The seller 102 authorizes the buyer by verifying the authorization response at 175. The seller then sends the order on to fulfillment 180 and breaks the shared session 140 by returning to the initial state 110.

It is appreciated that the roles of buyer and seller can be performed by a proxy or agent. For example, a seller may use an application or a website to interact with the buyer. The buyer may similarly mediate the transaction through an agent or proxy, such as a browser, credential store, or other application. Each of the steps involved may also consist of multiple steps, some of which may be offloaded to external processes or modules.

As noted above, existing credential stores only assist in part of the transaction model. For example the password manager applications discussed above help buyers authenticate to a seller by storing usernames and passwords, but they do not provide support for authenticating or authorizing the seller to use the buyer's information. Similar discrepancies exist between subscribers and providers. Generally, this problem can be described as a gap between business-side authentication and authorization and, consumer-side authentication and authorization. The terms "business-side" and "consumer-side" are simply labels; they are intended to be broadly construed to encompass transactions between parties even if the "business-side" party is not a business (for example, a government or non-profit entity) and the "consumer-side" party does not actually "consume" anything.

However, assisted consumer-side authorization can be beneficial for less-technical users to prevent social-engineering attacks such as phishing. In addition, given the generally less-granular nature of authorization information, consumers may assume greater risk by providing such credentials. For example, a website that leaks credit card information puts the consumer's credit at risk across a range of stores, not just in the store that improperly released the credit card information.

Assisted authorization can also be used to mitigate the risk associated with reused, credentials, including personally identifying information such as addresses (which generally must be the same across multiple sites) and reused usernames (which are frequently are the same across multiple sites).

In one embodiment, a credential store is extended with authorization-related credential information, such as credit card information, bank account numbers, etc. Applications aware of the credential-providing service form fill from the credential store. The credential store only allows the release of information if specific consumer-side authorization statements are satisfied.

Figure 2:
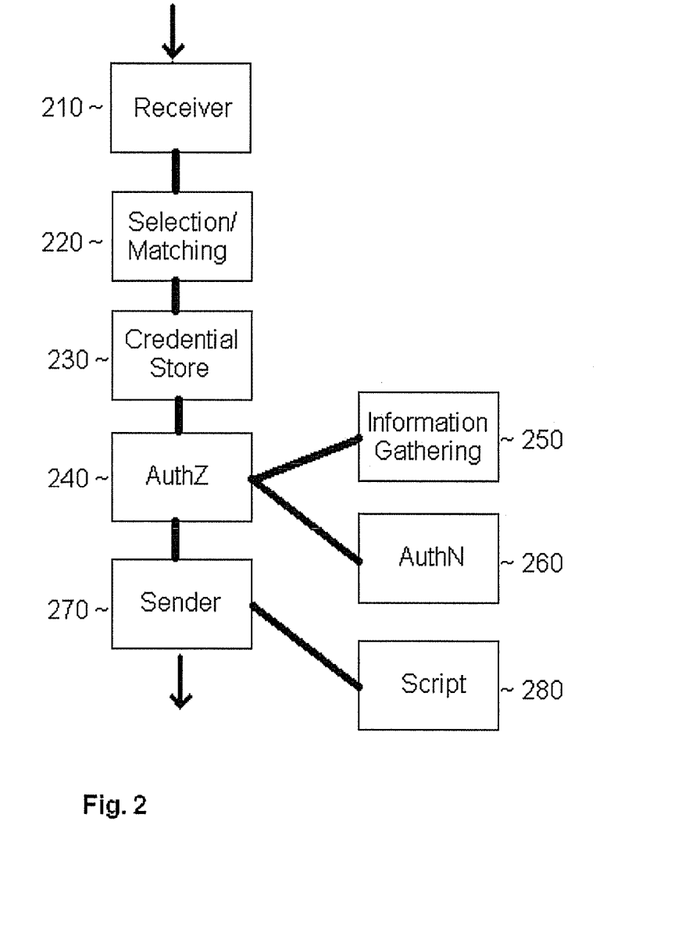
FIG. 2 is a diagram of an extended credential store system in accordance with one embodiment.

One exemplary embodiment is shown in FIG. 2. In this and other embodiments, various objects or components may be implemented as computing modules. These modules may be general-purpose, or they may have dedicated functions such as memory management, program flow, instruction processing, object storage, etc. The modules can be implemented in any way known in the art. For example, in one embodiment a module is implemented in a hardware circuit comprising custom VLSI circuits or gate arrays, off-the-shelf semiconductors such as logic chips, transistors, or other discrete components. One or more of the modules may also be implemented in programmable hardware devices such as field programmable gate arrays, programmable array logic, programmable logic devices or the like.

In another embodiment, one or more of the modules are implemented in software for execution by various types of processors. An identified, module of executable code may, for instance, comprise one or more physical or logical blocks of computer instructions that may, for instance, be organized as an object, procedure, or function. Further, the executables of an identified module need not be physically located, together, but may comprise disparate instructions stored in different locations that, when joined logically together, comprise the module and achieve the stated purpose for the module. A "module" of executable code could be a single instruction, or many instructions, and may even be distributed over several different code segments, among different programs, and across several memory devices. Similarly, operational data may be identified and illustrated in association with one or more modules, and may be embodied in any suitable form and organized within any suitable type of data structure. The operational data may be collected as a single data set, or may be distributed over different locations including over different storage devices, and may exist, at least partially, merely as electronic signals on a system or network.

Another embodiment uses higher-level components as modules. For example, one module may comprise an entire computer acting as a network node. Another module may consist of an off-the-shelf or custom program, such as a database management system. These higher-level modules may be decomposable into smaller hardware or software modules corresponding to different parts of a software program and identifiable chips (such as memory chips, ASICs, or a CPU) within a computer.

Returning to the example in FIG. 2, assume that two parties (a buyer and a seller) are in the unauthenticated state 110 as described in FIG. 1. In one embodiment, a receiver module 210 receives a request for one or more credentials. In one embodiment, this receiver module is a web browser. The credential request is sent from a remote party over HTTP or HTTPS in response to GET or POST. In another embodiment, the credential request is received as a JSON or XML-RPC data structure. In a third embodiment, the credential request is included as an embedded object using the EMBED or OBJECT tags. In a fourth embodiment, the credential request is a form within, an HTML page. In a fifth embodiment, the credential request is a specially-formatted document linked via a LINK tag, with a REL attribute that specifies that the linked document is a credential request. In a sixth embodiment, the credential request is sent over SMTP as a MIME attachment to an email. It a seventh embodiment, a custom protocol is used. In an eighth embodiment, a custom application is used to connect to different data sources over a network. Each data source has its own authentication requirements.

The receiver module 210 contains logic instructions that allow it to interpret the incoming documents or media and identify credential requests. In one embodiment, this is done by evaluating the input names in an HTML form. In another embodiment, the requested credentials are defined within a parseable structured document, such as an XML document. A parser is used to separate the tokens corresponding to particular credential requests. In a third embodiment, an extension is used to interpret an application-specific credential request format. A fourth embodiment uses a regular expression module to parse received documents and identify credential requests within the documents. A fifth embodiment uses a dispatching function to give credential requests to a particular "handler." The receiver module may not necessarily contain any interpretation logic as to the credentials themselves; rather, it is focused on separating credential requests from the other documents and media which are sent over the network. There are no particular limitations on whether the credential requests refers to an authentication or authorization credential. In a sixth, embodiment, the request is implicit; the credential store is programmed to always ask for certain types of credentials.

Once the credential request is processed through the receiver module 210 it is passed to a selection and matching module 220 to determine which credentials should be released. However, other embodiments mix these two functions together in a single module or separate them out further into multiple modules. In this embodiment the receiver module 210 is designed to separate a credential request from the mass of other media sent to the client system the selection and matching module 220 is designed to separate particular credential requirements from the credential request, turn them into potential credential identifiers, and allow for selection of the preferred credential. These credential identifiers may be strings, tags, values in an array or struct, magic numbers, URIs, or any other identifier capable of semantically distinguishing between separate credentials.

Various implementations of the credential-matching module are possible. In one embodiment, this consists of a simple "form-filler" module that matches credentials to form names, indexed on a URL. In another embodiment, a specific format, such as an XML-formatted credential request, is used to identify the requested information. A parsing module is used to analyze the XML and determine which credentials are required. A fourth embodiment is implemented as a browser extension module, and as such has privileged access to the body of the document. The module walks the DCOM to determine which credentials are included in the credential request. A fifth embodiment allows the business side to specify what credential types and claims are required.

Those skilled in the art will appreciate that no information has actually been released by the credential store at this point; only credential identifiers have been used. Until the credential requester has passed an authorization process, no credential information is actually released to the requester.

Once the requested credentials have been identified, the credential storage module 230 is activated and secure tokens representing actual credential information are retrieved. In one embodiment, the secure credential store is an encrypted database module. The credentials are retrieved using standard database API calls after a properly secured connection has been established. In another embodiment, the credentials are contained within a hidden and encrypted file maintained by the operating system. A system API is called that allows mediated access to the credential information based upon the logged-in identity seeking to access the credential store.

Before credentials are released, the authorization of the requesting party is evaluated by an authorization module 240 to determine if the credentials can and should be released. This can be accomplished via any script, policy, or authN/authZ mechanism known in the art. In one embodiment, this is done through the use of a rule engine module. Policies and authorization rules are defined by the extended credential system programmer or by the operator of the system. These policies can be evaluated to determine which credentials, if any, should be released. Policies and rules are allowed to be both conjunctive and disjunctive. In another embodiment, this is done by using an internal decision tree or jump table. Different facts gathered from internal and external sources can trigger different branches in the tree or different jumps in the table. When no further decisions can or need to be made, the context is evaluated to determine whether any credentials should be released. For example, if a site has transmitted an SSL certificate and established an SSL session, the "SSL-required" policy is satisfied and allows the release of credential information. In yet another embodiment, this is done via a state machine module embedded in the extended credential store. Other embodiments use multiple authorization implementations. For example, different authorization processes are followed for "low-value" and "high-value" credentials. In another embodiment, multiple passes by the authorization module are performed. For example, one embodiment uses layered policies to achieve better credential security. In another example, one embodiment uses global allow and deny lists, with layers of ever-more specific exceptions to address allowed or disallowed content within broader content domains.

Other embodiments may use information from third parties as part of the authorization process. If information from a third party is used, an information-gathering module 250 is used. In one embodiment, this module is allowed to access the outside world, via defined APIs. For example, one embodiment uses "phish filter" information provided by another module to evaluate the trustworthiness of a site. If a site is deemed trustworthy by the phish filter, the information gathering module reports back the results of the outside API to the authorization module. Another embodiment uses a site-analysis module to scrutinize the content of a web site for known security vulnerabilities, such as known vectors for cross-site scripting (XSS) attacks. If any known vulnerabilities are found, a "one-time use credit card," credential is matched. A third embodiment uses a communications module to check with publicly-available spam blacklists. If the requester has shown a tendency to misuse email addresses in the past, a "limited-validity email" credential is matched. A fourth embodiment uses a GUI module to interact with an operator to determine the appropriate credentials to release.

It is contemplated that multiple sub-modules may be used to implement the information-gathering module 250. It is also contemplated that information gathering and authorization may be accomplished via iterative or recursive processes. For example, one embodiment uses multiple policy statements governing the release of credential information. Credential release is governed by an "SSL-required" policy, a "phish-filter" policy, and a no-spam" policy. The extended credential store uses information from the seller (the SSL certificate), information from a phish filter and information from various blacklists (anti-spam information). After the evaluation of each policy constraint, the current results are evaluated to see if the processing has reached a halt point, such as an unrecoverable authorization failure or an end to constraints. If not, control is passed either to the authorization module (for continued processing) or the information-gathering module (for continued input) until after the next policy statement evaluation. In this embodiment, credential information is only released if a requester fits within all policy constraints. In another embodiment, however, partial release of credential information is possible. For example, assume a site uses SSL and is not a phishing site, but has misused customer email addresses in the past. The credential store could evaluate the inputs provided and choose to release either partial credential information (such as all requested information except for an email address) or limited credential information (such as a time-limited email address).

Another embodiment uses an additional authentication module 260 to verify seller identity information. In one embodiment, this is done by maintaining an encrypted connection to an outside DNS server. The IP address and domain name of the credential-requesting party can be matched against the IP address and domain given by the trusted outside DNS server. In another embodiment, the identity of the credential requester is matched against a location database to determine if the purported address of the requester is also registered with the postal service. In a third embodiment, geo-location by IP is used. In a fourth embodiment, the identity of the requester is provisionally trusted based upon an assertion given by a, third party.

Different types of policy constraints and interactions are contemplated between the authorization 240, authentication 260, and information-gathering 250 modules. For example, one embodiment uses rule location information to assemble a coherent policy from a polyhierarchy. Another embodiment pulls constraint information from a directory. A third embodiment uses role-based computing strategies to evaluate constraints. Arbitrarily complex policies may be defined that relate several different information stores. Other embodiments use reputation information, including signed reputation assertions, as inputs to the authorization process. In some cases, an unknown, seller can be authorized based upon the strength of a known recommender's reputation assertion. There is no inherent limitation on the type, quality, location, or provenance of constraints and authorization information. For example, information may also be gathered from the consumer/business session and the credential request.

Different embodiments may also use multiple authorization "phases," depending upon application constraints. For example, one embodiment performs a simple internal authorization prior to selecting any credential identifiers, thus narrowing the scope of the search during selection and matching. Other embodiments perform all authorization only after all relevant information is known.

Once the proper credentials have been identified and retrieved, and the credential receiver has been authorized, the credentials are passed to a sender module 270. The sender module is responsible for transmitting the credentials back to the requester in the correct form. In one embodiment, the sender module is implemented as a "form filler." In another embodiment, the sender module is an HTTP client, and formats the response as an HTTP post. In a third embodiment, the sender module operates over SMTP or another message-oriented protocol. In a fourth embodiment, the response is wrapped in a protocol envelope and sent back to the receiver.

Many embodiments allow recursive calls between the different sub-modules in the credential store. For example, assume a situation in which a particular credential (such as a credit card number) has been rejected. One embodiment allows the reauthorization of the requesting party so that a new credential can be released (such as an electronic check number). In a second embodiment, the authorization is short-circuited to present an alternative "equivalent" credential (such as a second credit card number). In a third embodiment, previously rejected credentials are removed from the acceptable list of credentials to prevent unacceptable recursion.

Some embodiments also include a scripting module 280. The scripting module can be used to take further action in the case a success or failure. In one embodiment, for example, the credential request is dropped if the receiver does not pass the authorization check. In another embodiment, however, the scripting module 280 informs the operator why authorization failed by logging a message or changing a display. In another embodiment, specific failure "scripts" are invoked by the scripting module 280 depending upon the type and cause of the authorization failure. Different embodiments may have specific rules, codes, or information screens associated with different failure cases. In some embodiments, the scripting module modifies one of the operator's user interface components to highlight fraud potential or allow a one-time exception. In, other embodiments, script actions may force reauthorization or reselection of credentials. In a further embodiment, the scripting module works to prevent the manual release of credentials in case of failure. For example, a script module integrated with a web browser could rewrite a form on an unauthorized site to disable the "submit" button.

Alternatively the scripting module 280 can be invoked when credential release is authorized. For example, some embodiments accompany the credential response with "obligation." These may include limitations on use of the credentials, additional contract terms, or other forward-looking guarantees required by the operator. Another embodiment uses the scripting module to make the transaction more convenient. For example, one embodiment allows "1-click" shopping at any scripted site without having to trust any outside parties with sensitive authentication or authorization information. After authenticating the site, the success script automatically interacts with the site to provide all the necessary details for a purchase; no further action by the operator is required.

It is appreciated that treating authentication and authorization credentials together allows for better granularity of authorization data. For example, credit card authorization information is not particularly granular, as the same card is used at multiple sites. Even if a unique-number card generator is used, only part of the information is changed. In addition, there are significant ease-of-use difficulties with current card-number generator programs. By combining limiting functionality (such as one-time-use functionality) with the credential store, more limited information could be used while still maintaining a consistent user experience. For example, one embodiment creates one-time cards that not only have a unique card number, but are also only good on a single day (the day of the transaction) for a single amount (the amount of the transaction) and to a single payee (the intended recipient). Other embodiments use limiting statements for other authorization credentials. For example, limited-exposure email addresses can be used to prevent future spam.

Further embodiments allow for the central administration of credential release. For example, those who are unaccustomed to working with computers or unfamiliar with online safety best practices may have difficulty distinguishing between legitimate sites, phishing sites, and legitimate-but-spamming sites. In one embodiment, a computer-knowledgeable person defines and maintains credential release policies for a number of less-knowledgeable users. The less-knowledgeable users are then able to visit various sites without worrying about leaking private information; their personal credentials will not be released without the authorization of the extended credential management system. Experienced users can move away from simple and explicit "trust" lists to more general and flexible rules for credential release.

It is understood that several modifications, changes and substitutions are intended in the foregoing disclosure and in some instances some features of the embodiments will be employed without a corresponding use of other features. Accordingly, it is appropriate that the appended claims be construed broadly and in a manner consistent with the scope of the embodiments described herein.

What is claimed is:

1. A method for using a first computer to access a shared session opened by a second computer over a network, the first computer having a communications circuit and configured to perform the steps of:
   presenting a transaction request to the second computer;
   receiving a credential request from the second computer over the network;
   matching the credential request to a credential from a set of available credentials controlled by the first computer, the credential comprising a consumer-side information;
   storing information relating to the set of available credentials;
   automatically evaluating an authorization of the second computer to receive the credential;
   retrieving a credential identifier from a credential store when the authorization is validated; and
   returning a credential response over the network to the second computer, wherein:
      the credential response is created using the credential identifier,
      the credential is drawn from a set including an authentication credential and an authorization credential,
      the credential response is used by the second computer to authenticate or authorize the first computer, and
      the credential response is selected from a group that includes the credential, a modified credential, an error, a credential sent in an HTTP post, a credential sent as a message-oriented protocol, and a credential wrapped in a protocol envelope.

2. The method of claim 1, wherein automatically evaluating the authorization of the second computer comprises at least one of the group consisting of: analyzing information provided by the second computer, retrieving information from a third computer, and evaluating the information from the third computer.

3. The method of claim 2, wherein the information from the third computer comprises reputation information.

4. The method of claim 1, wherein the first computer is further configured to authenticate the second computer.

5. The method of claim 1, wherein the first computer is further configured to execute a scripted action based upon a result of evaluating the authorization of the second computer.

6. The method of claim 1, wherein the first computer is further configured to perform a step that includes storing at the first computer the set of available credentials, the set available credentials comprising consumer-side information.

7. A non-transitory computer-readable storage medium configured to store instructions that, when executed by a first computer, cause the first computer to:
   access a shared session established over a network by a second computer;
   present a transaction request to the second computer;
   receive a credential request from the second computer over the network;
   match the credential request to a credential of a set of available credentials controlled by the first computer, wherein the available credentials comprise consumer-side information;
   store information relating to the set of available credentials;
   automatically evaluate an authorization of the second computer to receive the credential;
   retrieve the credential from a credential store when the authorization is validated; and
   return a credential response over the network to the second computer, wherein:
      the credential response is created using a credential identifier,
      the credential is drawn from a set including an authentication credential and an authorization credential,
      the credential response is used by the second computer to authenticate or authorize the first computer, and
      the credential response is selected from a group that includes the credential, a modified credential, an error, a credential sent in an HTTP post, a credential sent as a message-oriented protocol, and a credential wrapped in a protocol envelope.

8. The non-tranistory computer-readable storage medium of claim 7, wherein evaluating the authorization of the second computer comprises at least one of the group consisting of: analyzing information provided by the second computer, retrieving information from a third computer, and evaluating the information from the third computer.

9. The non-transitory computer-readable storage medium of claim 8, wherein the information from the third computer comprises reputation information.

10. The non-transitory computer-readable storage medium of claim 7, further storing instructions that, when executed by the first computer, cause the first computer to authenticate the second computer to the first computer using one of a password, passphrase, certificate, and key.

11. The non-transitory computer-readable storage medium of claim 7, further storing instructions that, when executed by the first computer, cause the first computer to execute a scripted action based upon a result of evaluating the authorization of the second computer.

12. The non-transitory computer-readable storage medium of claim 7, further storing instructions that, when executed by the first computer, cause the first computer to store the set of available credentials at the first computer.

13. A system for using a first computer that includes a processor and a storage medium to access a shared session that is established by a second computer, the system comprising:
   a receiver associated with the first computer to receive a credential request from the second computer over a network;
   a communications circuit under control of the first computer configured to access a shared session established by a second computer and configured to present a transaction request to the second computer;
   a selection and matching program adapted to match a credential from a set of available credentials to the credential request, wherein the set of available credentials comprise consumer-side information, and the set of available credentials and the selection and matching program are controlled by the first computer;

a credential circuit in the processor, wherein the credential circuit uses the storage medium to store information relating to the set of available credentials;

an authorization circuit in the processor for evaluating an authorization of the second computer to receive the credential; and a sender circuit in the processor adapted to send a credential response to the second computer over the network, wherein:

the credential response is created with a credential identifier, the credential is drawn from a set including an authentication credential and an authorization credential, the second computer uses the credential response to authenticate or authorize the first computer, and the credential response is selected from a group consisting of the credential, a modified credential, an error, a credential sent in an HTTP post, a credential sent as a message-oriented protocol, and a credential wrapped in a protocol envelope.

14. The system of claim 13, further comprising an information-gathering circuit under control of the first computer and configured to gather information from a third computer.

15. The system of claim 13, further comprising an authentication circuit under control of the first computer.

16. The system of claim 13, further comprising a script program that can be executed based upon a result produced by the authorization circuit.

* * * * *

UNITED STATES PATENT AND TRADEMARK OFFICE
CERTIFICATE OF CORRECTION

| | | |
|---|---|---|
| PATENT NO. | : 8,707,400 B2 | Page 1 of 1 |
| APPLICATION NO. | : 11/625663 | |
| DATED | : April 22, 2014 | |
| INVENTOR(S) | : Duane Buss et al. | |

It is certified that error appears in the above-identified patent and that said Letters Patent is hereby corrected as shown below:

In the Claims

Column 9, Claim 1, line 31: "credential comprising a consumer-side" should read --credentials comprising consumer-side--.

Column 10, Claim 8, line 32: "The non-tranistory" should read --The non-transitory--.

Signed and Sealed this
Second Day of September, 2014

Michelle K. Lee
*Deputy Director of the United States Patent and Trademark Office*